Jan. 25, 1955

N. O. ROBERTS 2,700,736

METHOD AND APPARATUS FOR MEASURING RADIATION QUANTITIES

Filed April 20, 1950

INVENTOR.
NEWELL O. ROBERTS
BY
ATTORNEY.

Jan. 25, 1955     N. O. ROBERTS     2,700,736
METHOD AND APPARATUS FOR MEASURING RADIATION QUANTITIES
Filed April 20, 1950     3 Sheets-Sheet 3
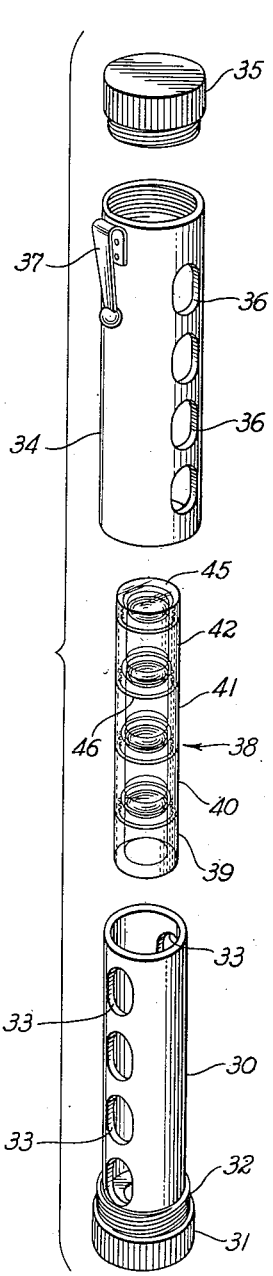
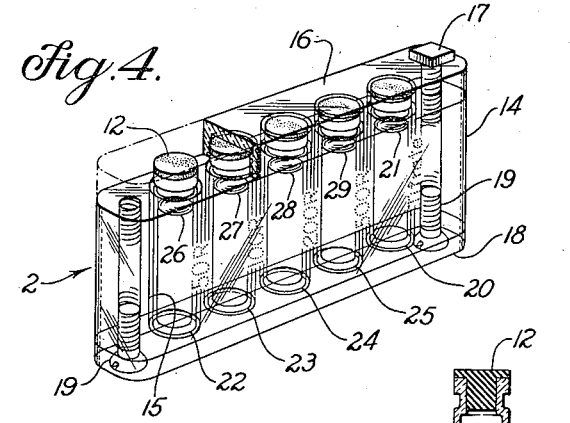
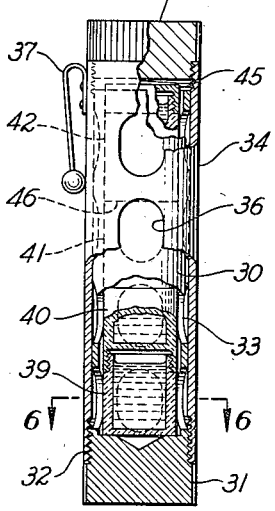
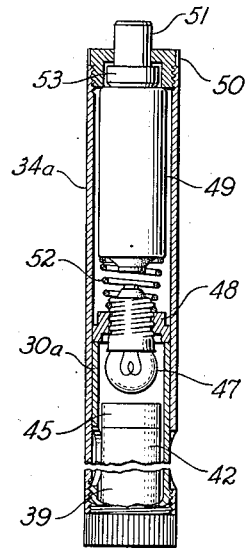
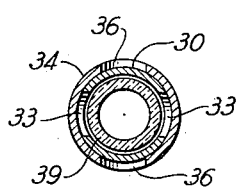
INVENTOR.
NEWELL O. ROBERTS
BY
Roland A. Anderson
ATTORNEY.

United States Patent Office 2,700,736
Patented Jan. 25, 1955

2,700,736

METHOD AND APPARATUS FOR MEASURING RADIATION QUANTITIES

Newell O. Roberts, Liverpool, England, assignor to the United States of America as represented by the United States Atomic Energy Commission Application April 20, 1950, Serial No. 157,069

16 Claims. (Cl. 250—83)

The present invention relates to the measurement of electromagnetic radiation and more particularly to methods and apparatus for the measurement of X ray and gamma radiation.

There exists an ever-increasing demand for improved methods and devices for detecting and measuring X ray and gamma radiation. Various electrical and photometric methods and devices have in the past been utilized and employed wherever radiation of this character has been encountered, for example, in nuclear research, industrial applications and also in the medical profession. With the establishment of extensive installations in the first-named field wherein high levels of radioactivity may be encountered due either to the characteristics of the process or to the extremely radioactive nature of the material being processed and the possibility of its accidental dispersion, there has come into being an acute industrial hazard. Moreover, large segments of a population may be exposed to such radiation in the event of atomic explosions, by leakage of highly radioactive material from industrial establishments or in other ways, such as while handling radioactive tracer material.

Accordingly, for the applications briefly mentioned in the foregoing and many others, there is a definite need for simple, rugged and compact devices of the class referred to which may be produced in quantity at low cost; a further important requirement is that such apparatus should be easily calibrated for its purpose of indicating, detecting and measuring quantities of X ray and gamma radiation for the specific field of application.

The present invention provides rapid and reliable methods and apparatus for indicating, detecting and measuring quantities of X ray and gamma radiation and in its various forms utilizes my discovery that certain halogenated hydrocarbons are decomposed to produce acidic materials in direct proportion to the quantity of X ray or gamma radiation to which they are subjected and that the quantity of acidic material produced may conveniently be determined by simple acidimetric means employing modified titration methods. Methods of practicing the invention are disclosed hereinafter wherein exposure to a predetermined quantity of such radiation produces a visible color change in the solutions employed and, thereby, it is found possible to provide calibrated scales of solutions for colorimetrically indicating quantities of such radiation. Devices capable of indicating or measuring quantities of X ray and gamma radiation in accordance with the teaching of the invention will be referred to hereinafter by the term "dosimeter."

Accordingly, it is an object of the invention to provide a method for determining quantities of X ray or gamma radiation by the measurement of acidic materials evolved.

A second object of the invention is to provide solutions which change color upon exposure to predetermined quantities of X ray or gamma radiation.

A third object of the invention is to provide calibrated colorimetric indicator scales comprising series of solutions which change color on exposure to predetermined quantities of X ray or gamma radiation.

Another object of the invention is to provide color sensitive means for determining and indicating quantities of X ray or gamma radiation.

Another object of the invention is to provide solutions containing a constituent which releases acidic materials upon irradiation with gamma or X rays.

An important object of the invention is to employ the method of determining the quantity of X ray or gamma radiation by the measurement of acidic materials evolved from halogenated hydrocarbons irradiated therewith in combination with a source of such radiation.

A further object of the invention is to provide solutions capable of producing acidic materials therein under exposure to X ray or gamma radiation and which solutions are capable of retaining the produced acidic materials.

A further object of the invention is to provide devices employing radiation sensitive solutions to measure colorimetrically indication quantities of X ray or gamma radiation.

A still further object of the invention is to provide simple, rugged and compact devices incorporating color-responsive, radiation-sensitive solutions to indicate dosages or quantities of X ray or gamma radiation.

The invention, both as to its organization and method of operation together with further objects and advantages thereof, will best be understood by reference to the following description taken in conjunction with the accompanying drawings of which:

Fig. 3 is a longitudinal cross-sectional view of an elemental dosimeter of this invention and comprising a vial for retaining the radiation sensitive solutions of the invention;

Fig. 4 is a perspective view partly in section of an embodiment of one form of dosimeter utilizing a plurality of vials for carrying out a modified X ray and gamma radiation measurement and indication in accordance with the invention;

Fig. 5 is an elevational view partly in section of another form of dosimeter utilizing a plurality of vials;

Fig. 6 is a transverse cross-sectional view taken on the plane 6—6 of Fig. 5;

Fig. 7 is an "exploded" view of the dosimeter of Fig. 5;

Fig. 8 is a vertical sectional view partly in elevation of an embodiment of a dosimeter, such as that shown in Fig. 5, which has been modified to provide internal illumination of the vials therein.

Figure 1:
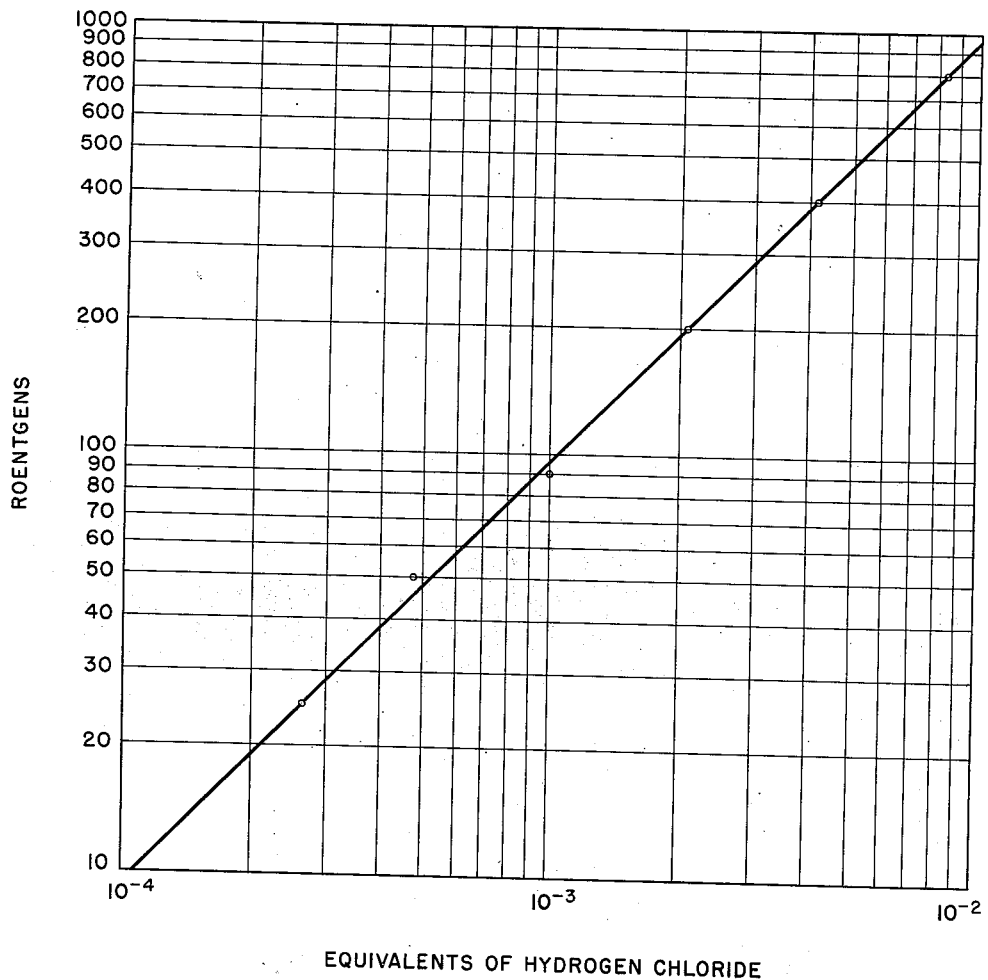
Figure 1 is a graphical representation of the quantities of acidic materials considered to be hydrogen chloride produced in a solution of carbon tetrachloride by the indicated quantities of X ray radiation.

In accordance with the present invention, a radiation sensitive solution contains, as a constituent thereof, a halogenated hydrocarbon which is susceptible to decomposition evolving acidic materials upon exposure to X ray or gamma radiation. As employed in the colorimetric dosimeter of my invention, such a solution contains an acidimetric indicator which changes color in response to the production of the acidic materials formed by exposure to such radiation. In order to provide a proper environment for the reaction to produce said acidic material a solvent, such as alcohol, may also be included in the solution. It should be noted that the solvent serves the multiple purpose of solubilizing the indicator in the chlorinated hydrocarbon solvent, provides a proper environment wherein the acidimetric indicator dye may properly ionize and undergo the desired color change as well as providing the said proper environment wherein the acidic materials are formed. Also, the sensitivity of the solution may be adjusted by the provision of appropriate quantities of an aqueous alcoholic solution of a suitable basic material so that the color change will occur with different quantities of radiation.

More particularly, an aqueous alcoholic solution of a halogenated hydrocarbon such as carbon tetrachloride or chloroform may be prepared. It has been found that in such a solution, hydrogen chloride is generated in amounts directly proportional to the quantity of gamma or X ray radiation to which it is subjected. It will be appreciated that the hydrogen chloride formed is immediately absorbed in such a solution to form hydrochloric acid. In the event some other halogenated organic compound is used the corresponding acid is formed. The quantity of hydrochloric acid may be determined by any convenient acidimetric means. In order to provide a convenient colorimetric method for indicating the production of the hydrogen chloride, a suitable acidimetric indicator may be included in the solution. While other indicators may be employed, Bromcresol Green, pH interval 3.8–5.6., has been found to be completely satisfactory and is preferred. To provide for adjusting the sensitivity of the solution and, accordingly, the quantity of radiation which is required to cause the color change, appropriate quantities of an alcoholic base solution such as alcoholic potassium hydroxide is added to the mixture. By adding quantities of alcoholic base which are determined by a method which will be more fully explained hereinafter, the quantity of hydrogen chloride required to effect a color change may be predetermined and, accordingly, the color change will occur when the equivalent amount of hydrogen chloride is generated in the solution by irradiation with X ray or gamma radiation. Should a closer determination of the quantity of radiation be desired, the underexposed solutions may be titrated with supplemental quantities of standard acid solution and the quantity formed by the irradiation may then be determined by difference. Likewise, overexposed solutions may be back-titrated with standard base solution and the quantity of acidic material determined by adding the original and total quantities of base employed.

Particular details of the methods of the invention will become apparent from the following description of specific examples of X ray and gamma radiation measurements in accordance with the invention.

Example A

Aliquots of aqueous alcoholic solutions of chloroform and of carbon tetrachloride were irradiated with various quantities of X rays and the hydrogen chloride produced in each aliquot was determined by titration with alcoholic potassium hydroxide using Bromcresol Green, pH 3.8–5.6, as an indicator.

Figure 2:
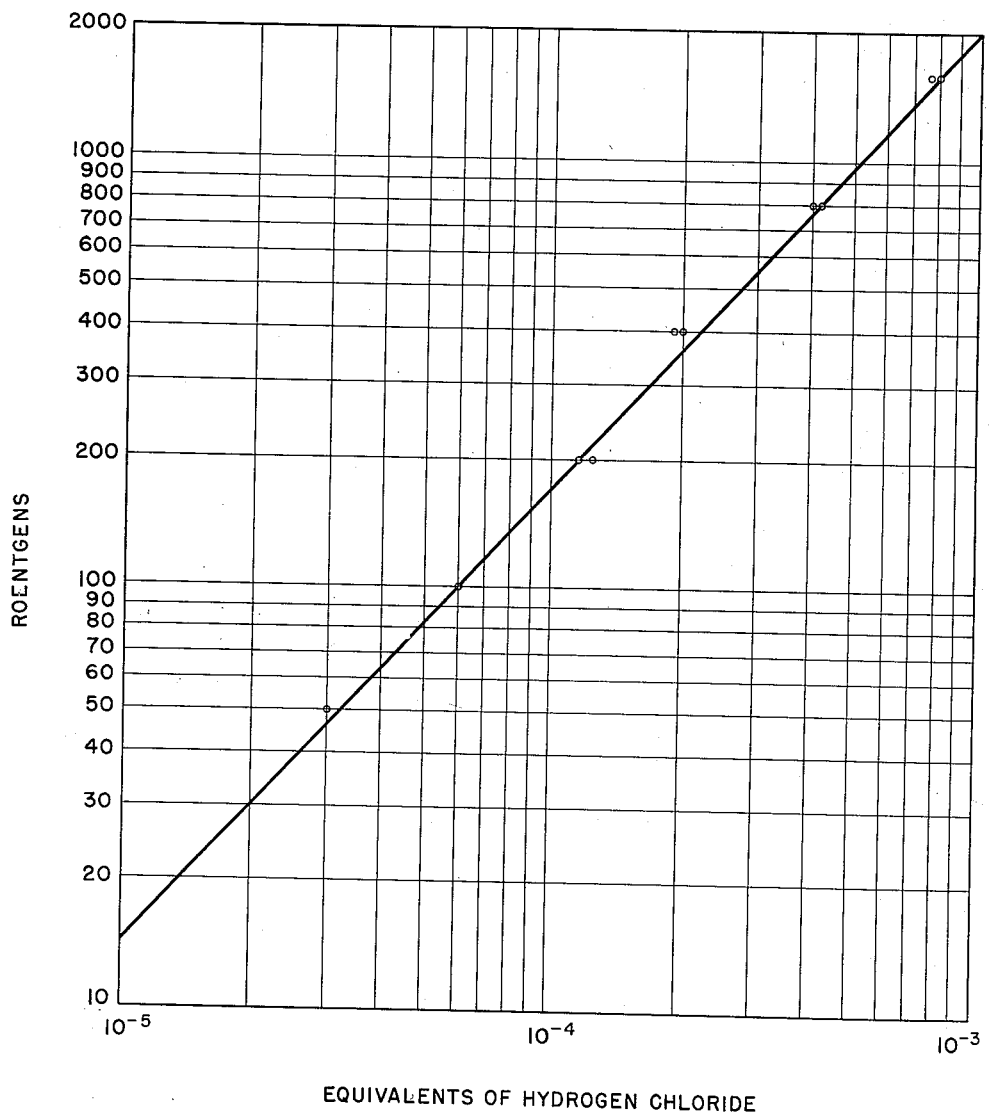
Fig. 2 is a graphical representation of the quantities of hydrogen chloride produced in a solution of chloroform by the indicated quantities of X ray radiation.

More particularly, aliquots of 95% alcoholic solutions of chloroform and of carbon tetrachloride were exposed to irradiation with 250 kv. X rays and the hydrogen chloride evolved was determined by titration with $10^{-3}$ N alcoholic potassium hydroxide solution with the results indicated in the graph of Figs. 1 and 2. In Figs. 1 and 2, the quantity of X ray radiation is indicated in Roentgen units along the logarithmic scale of ordinates and the corresponding quantity of hydrogen chloride evolved from carbon tetrachloride and chloroform solutions, respectively, is indicated along the logarithmic abscissae scale. A smooth curve is shown drawn through the experimental points and it is to be noted that the hydrogen chloride is released in amounts substantially directly proportional to the quantity of radiation. Such a curve may be prepared and serve as a calibration curve for use in determining quantities of radiation. Accordingly, an accurate determination of an unknown quantity of radiation may be made by exposing a solution such as those comprising the aliquots, supra, to such radiation, titrating the hydrogen chloride produced and determining the corresponding quantity of radiation from such a calibration curve.

While the curve shown was obtained using 250 kv. X rays, gamma rays of a similar energy, produce substantially the same curve. Variation in the energy of the radiation from the value indicated produces only slight changes from the values shown. However, major deviations of the energy of the radiation from the value shown may be expected to produce a displacement of the calibration curve. The accuracy of the results are not appreciably affected by temperature changes or photochemical effects. Changes in the concentration merely affect the sensitivity of the solutions; therefore, it is contemplated that substantial variations from the values shown may find suitable application.

Example B

Radiation-sensitive solutions which are color-responsive with respect to exposure to predetermined quantities of X ray or gamma radiation may be prepared as follows: Such a solution essentially contains a halogenated hydrocarbon which evolves quantities of acidic substances which are proportional to the quantity of radiation, and an acidimetric indicator. A solvent is provided to furnish a sutable environment for the reaction and appropriate quantities of basic materials are provided for adjusting the sensitivity of the solution so that the color change will occur at the predetermined level of irradiation.

Illustratively, such a color-responsive solution may be prepared by mixing 5 ml. of carbon tetrachloride with 5 ml. of 95% ethyl alcohol and 0.2 ml. Bromcresol Green indicator solution. The Bromcresol Green indicator solution may, conveniently, be prepared by dissolving 0.1 gm. of Bromcresol Green crystals in 10 ml. of absolute ethyl alcohol and then adding 90 ml. of distilled water. Preferably the pH of the solution is then adjusted to a value of about 4.6 by the addition of a base such as sodium hydroxide.

The sensitivity of the color-responsive solution is then adjusted by adding appropriate quantities of a $10^{-3}$ N potassium hydroxide in 95% commercial ethyl alcohol solution. The following table indicates the quantity of such an alcoholic potassium hydroxide solution which have been found to be required to adjust the sensitivity of the solution prepared as described above to provide a solution which is color responsive to the indicated quantity of 250 kv. X ray radiation. Other values may be determined from the table by interpolation or extrapolation.

|   | $10^{-3}$ N KOH Added | Radiation |
|---|---|---|
|   | ml. | r. |
| a | 2 | 125 |
| b | 4 | 325 |
| c | 8 | 500 |

While the foregoing specific examples illustrate the use of the chlorinated hydrocarbons, carbon tetrachloride and chloroform in the formulation of the radiation sensitive solutions, other halogenated hydrocarbons may likewise be employed. The sole requirement for the halogenated hydrocarbon is acidic materials are evolved by them upon exposure to ray or gamma radiation. Other suitable halogenated compounds may be found in the aliphatic, aromatic, cyclopentanoperhydrophenanthrene, and naphthenic halogen derivatives. The concentration of halogenated hydrocarbon may be varied. However, in choosing the concentration it is to be noted that the total quantity of acidic material released in a given volume of solution will vary in direct proportion to the concentration of the halogenated hydrocarbon.

Ethyl alcohol has been employed in conjunction with the halogenated hydrocarbon to provide a proper environment for the reaction; however, many other fluid alcohols and oxygenated organic solvents may likewise be employed. The requirement for this material is that it must provide for the absorption of the acidic material produced by the radiation in the event the halogenated material is incapable of this function and/or provide a suitable environment for proper operation of the indicator. The solvent also serves to make miscible the halogenated hydrocarbon and water present.

Bromcresol Green has been found very satisfactory for use as the indicator in the solutions and is preferred; however, other acidimetric indicators may be employed with appropriate modification of the process. For example, potentiometric methods may be substituted.

The titration of the solution may be performed using any suitable basic solution with modification of the method. Alcoholic potassium hydroxide has been found completely satisfactory, and is preferred for the purposes of the invention while other basic solutions may be employed if desired. Moreover, it is contemplated that practically all known methods of acidimetry should operate successfully in determining the amount of acidic material which is evolved.

The kinetics of the reaction, whereby the acidic materials are evolved, is not completely understood. The acid produced by the reaction appears to be the strong hydro-halogen acids such as hydrochloric; however, it is possible that other acids might likewise be formed to some extent.

Dosimeters, which employ radiation sensitive solutions of the character described above, may take various forms. An elemental form of such device is shown in Fig. 3, which depicts a single cell dosimeter having the form of a hollow cylindrical vessel or vial 11, the constricted neck portion of which may be closed by a stopper 12, for example. Vial 11 may be filled with a radiation sensitive solution 13 prepared as described in the foregoing. In the event that the solution selected is color responsive, vial 11 preferably is made of transparent ray pervious, acid resistant material; if such solution, however, is of the type requiring a later determination of the quantity of acidic substance evolved, vial 11 may be formed of a suitable opaque material.

The dosimeter of Fig. 3 provides a convenient means for measuring or indicating radiation in relatively inaccessible or limited areas due to its effectiveness despite its small size. For example, a vial of 2 cc. capacity may be inserted into body cavities for measuring internal dosages of radiation or may be used as the individual indicating unit of more complex devices as described below.

With reference now to Fig. 4, there is shown a multiple cell dosimeter, generally indicated at 2 and providing a plurality of individual cells, each of which may contain a different and graduated, radiation responsive solution. Dosimeter 2 may be seen to comprise transparent case adapted to carry a number of individual cells similar to dosimeter 11. This form of dosimeter may comprise a transparent block 14 of "Lucite", for example, having a series of cylindrical bores 15 disposed in parallelism therethrough. A top plate 16 may be retained in position to cover said openings through the use of suitable means, such as spaced screws 17, which are threadably received in the body portion of the block, while a bottom plate 18 permanently attached to opposite face of the block 14 as by screws 19 also received in the block in aligned relation with respect to screws 17. Instead of utilizing bores 15 as immediate receptacles for the radiation sensitive solutions, which would necessitate a liquid seal for the cover plates 16 and present difficulties in removing the contents, it is preferred to proportion the former to snugly receive individual vials, such as that shown in Fig. 3. One of such vials as 20, for example, may contain a solution 21, prepared and utilized in accordance with the method indicated in A above, while the remaining vials 22 through 25 may contain solutions 26-29, prepared in accordance with the method indicated in Example B above and constituting a color-indicating scale. Illustratively, solutions 26-29 may be radiation responsive to change color at 50 r., 100 r., 200 r., and 500 r., respectively, while solution 21 is one later to be subjected to acidimetry tests for accurately determining the actual exposure as previously described herein. It will be apparent that when dosimeter 2 is exposed to an unknown quantity of X ray or gamma radiation each of the solutions 26-29 undergoes a color change as the predetermined sensitivity is exceeded and thereby immediately indicates the value of the exposure as lying between the colored and adjacent uncolored solutions. For a more accurate determination of the quantity of radiation, solution 21 may be titrated and the radiation value determined as described.

A still more compact multiple cell dosimeter is shown in Figs. 5, 6 and 7, and is seen to be of generally cylindrical configuration.

In such embodiment a lower, cylindrical body 30 of suitable material such as brass, is closed by an integral and enlarged knurled cap 31 surmounted by a short, externally threaded portion 32, while diametrically disposed wall portions of the body proper extending thereabove are provided with a plurality of longitudinally spaced, and preferably axially elongated apertures 33. An upper cylindrical body 34 of greater diameter than the body 30 is internally threaded of its lower end to receive the threaded portion 32 of the latter and similarly threaded at its upper end to receive the knurled cap 35. Longitudinally spaced apertures 36 similar to the apertures 33 are provided in the diametrically opposite wall portions of the body 34 and a pocket clip 37 is affixed to the latter near the upper end thereof. It is preferred that the parts be so proportioned that the respective apertures 33 and 36 of cylinders 30 and 34 will be aligned when the dosimeter casing is assembled as shown in Fig. 5 and one-quarter turn short of a fully telescoped relation for a purpose later to be described.

Disposable within the telescoped bodies 34 and 30 and immediately surrounded by the latter, is a transparent cell assembly of ray pervious, acid resistant receptacles, for example, generally indicated at 38 and constituted of a plurality of individual, liquid-tight, cylindrical cells 39-42 in axial alignment. It will be observed that the uppermost cell 42 is closed by a threaded cap 45 whose outside diameter constitutes a continuation of the curved wall of cell 42 and that such wall is extended below the bottom 46 of said cell and inwardly threaded to receive the upwardly projecting, similarly threaded lip of the adjacent cell 41, thereby uniting said cells. It will be seen that the bottom of each cell serves as a cover for the adjacent lower cell and the lowermost cell 39 having the depending threaded portion omitted. For use as a radiation measuring or indicating device the individual cells are filled with color indicating radiation sensitive solutions prepared in accordance with the method of Example B, above.

Illustratively, the individual cells of cell assembly 38 may contain color indicating solutions having a respectively graduated sensitivity and due to the centering of the individual cells with respect to the apertures of the body members 30 and 34 (Fig. 5), observation of the change in color of such cells is facilitated whenever the body 34 is rotated to align the corresponding apertures. When body 34 is rotated to its fully telescoped position such apertures will be in a position which is 90 degrees past their registry position and hence protected from accident of injury when carried on the person. The mode of operation of the color indicating solutions in the cells 39-42 provides a scale for determining exposures in a manner substantially the same as that which was described for solution 26-29 of dosimeter 2 and need not be redescribed. However, it may be noted that the device described in the preceding is particularly useful for excluding light and thereby avoiding undesirable effect such as destruction of the indicator dye and production of acid in the system which may result on extended exposure to strong light such as sunlight.

The dosimeter of Figs. 5-7 may be modified to provide internal illumination of the cell assembly to facilitate its visual inspection under adverse external lighting conditions, which form of the invention is illustrated in Fig. 8.

In Fig. 8, body 30a has been extended appreciably above the cover 45 of cell 42 to provide vertical accommodation of an electric lamp 47 threaded into an annular socket 48 which rests on the terminal wall of said body. Body 34 is also materially extended to provide in addition to the apertured wall portion of Figs. 5-7, a tubular housing for an uncased battery 49 of the conventional flashlight or "pen-light" type. The upper end of body 34a, in addition to the pocket clip (not shown) may be internally threaded to receive centrally apertured cap 50, through which projects a pin 51 serving as a push button. The latter serves to move the battery 49 longitudinally toward the base of lamp 47, compressing the interposed coil spring 52 and establishing contact between the central terminal of the battery and the corresponding terminal of the lamp and thus energize the latter. A shoulder 53 of increased diameter and integral with the pin 51 serves to retain the latter in position and to transmit pressure to the battery 49 as will be readily apparent.

Preferably, the position of registry for corresponding inspection apertures of the body members 30a and 34a is one-half turn short of the fully telescoped position of said members to provide a position of maximum protection for the cell assembly, since in this embodiment only a single series of apertures is provided in each body member.

While there have been described what are at present considered to be the preferred embodiments of the invention, it will be understood that various modifications may be made therein and it is intended to cover in the appended claims all such modifications as fall within the true spirit and scope of the invention.

What is claimed is:

1. In a method of measuring X ray or gamma radiation, the steps comprising exposing a homogeneous fluid aqueous alcoholic solution of a material selected from the group consisting of chloroform and carbon tetrachloride to said radiation, whereby a proportionate amount of hydrochloric acid is produced therein, adding an alcoholic solution of an acidimetric dye to said solution, and determining the quantity of hydrochloric acid resulting from said exposure by titration with standard alcoholic base solution, whereby the quantity of said radiation may be determined.

2. A method of measuring X ray or gamma radiation comprising producing a homogeneous fluid composition comprising a halogenated aliphatic hydrocarbon dissolved in aqueous alcoholic solution together with an acidimetric indicator, exposing a portion of said composition to a known quantity of said radiation to determine the quantity required to cause a color change of said acidimetric indicator, and exposing a second portion of said composition to an unknown quantity of said radiation, whereby the color change produced in said second portion immediately indicates that said unknown quantity of radiation exceeds the known quantity.

3. A method of measuring X ray or gamma radiation comprising producing a series of compositions comprising a chlorinated aliphatic hydrocarbon dissolved in an aqueous alcoholic solvent together with an acidimetric indicator wherein different proportions of a basic material is added to the individual compositions of said series, whereby said series of compositions will progressively undergo a color change upon exposure to different known quantities of said radiation, and exposing portions of said compositions to an unknown quantity of said radiation, whereby at least the minimum quantity of said unknown radiation is indicated by the color change of one of the compositions of said series.

4. A single cell dosimeter for measuring and indicating X ray or gamma radiation comprising a transparent, ray pervious, acid resistant, portable receptacle, a radiation sensitive liquid composition comprising a homogeneous fluid solution of a chlorinated aliphatic hydrocarbon solute in an aqueous alcoholic solvent and containing an acidimetric indicator dye disposed in said container, and means for retaining said composition within said container in all positions of the latter.

5. A multi-cell dosimeter for measuring and indicating X ray or gamma radiation comprising means defining a plurality of ray-pervious, acid resistant receptacles, liquids of different radiation sensitivities and comprising homogeneous fluid solutions of a chlorinated aliphatic hydrocarbon solute in an aqueous alcoholic solvent and containing an acidimetric dye wherein said different sensitivities are obtained by the use of varied predetermined amounts of basic materials disposed in the respective receptacles and means for retaining said liquids in their respective receptacles, in all positions of the latter.

6. A multi-cell dosimeter for measuring and indicating X ray or gamma radiation comprising means defining a plurality of transparent, ray-pervious, acid resistant receptacles, liquids which change color upon exposure to different, predetermined quantities of radiation and comprising homogeneous fluid solutions of a chlorinated aliphatic hydrocarbon solute in an aqueous alcoholic solvent and containing an acidimetric dye wherein said predetermined color change is obtained through the use of a predetermined amount of basic material disposed in the respective receptacles, and separable cover means for retaining said liquids in their respective receptacles in all positions of the latter.

7. A multi-cell dosimeter for measuring and indicating X ray or gamma radiation comprising a transparent, ray pervious block having a plurality of liquid-retaining bores therein communicating with an outer surface of said block, liquids which change color upon exposure to different, predetermined quantities of radiation disposed in the respective bores and comprising homogeneous fluid solutions of a chlorinated aliphatic hydrocarbon solute in an aqueous alcoholic solvent and containing an acidimetric dye wherein said predetermined color change is obtained through the use of a predetermined amount of basic material, and a unitary, transparent cover separable from said block for retaining said liquids in their respective bores in all positions of said block.

8. A multi-cell dosimeter comprising a transparent, multi-cellular, cylindrical container having a plurality of separable, liquid-tight cells disposed axially thereof, liquids which change color upon exposure to different, predetermined quantities of radiation and comprising homogeneous fluid solutions of a chlorinated aliphatic hydrocarbon solute in an aqueous alcoholic solvent and containing an acidimetric dye wherein said predetermined color change is obtained through the use of a predetermined amount of basic material disposed in the respective cells, and an opaque telescoping, outer casing for said container, said casing being apertured transversely at the positions of said cells within the same to permit visual observation thereof.

9. The dosimeter of claim 8 wherein said telescoping, outer casing comprises a pair of tubular members having a threaded connection therebetween.

10. The dosimeter of claim 8 including a source of artificial illumination disposed within said telescoping, outer casing.

11. A multi-cell dosimeter comprising a transparent, multi-cellular, cylindrical container having a plurality of separable, liquid-tight cells disposed axially thereof, liquids which change color upon exposure to different, predetermined quantities of radiation and comprising homogeneous fluid solutions of a chlorinated aliphatic hydrocarbon solute in an aqueous alcoholic solvent and containing an acidimetric dye wherein said predetermined color change is obtained through the use of a predetermined amount of basic material disposed in the respective cells, a cylindrical, longitudinally perforated member surrounding said container and having a threaded, lower cap, an opaque elongated similarly perforated, cylindrical member surrounding said first member and having threaded engagement with said cap, and a source of artificial illumination disposed in the upper position of said elongated member and operable externally thereof to permit visual inspection of said cells through said apertures upon correct rotary orientation of said members.

12. In a method of measuring X ray or gamma radiation quantities, the steps comprising exposing to such radiation a homogeneous fluid solution containing in admixture a halogenated aliphatic hydrocarbon, substantial quantities of water and an oxygenated organic solvent having the physical properties of common miscibility with water and said halogenated aliphatic hydrocarbon, thereby to form said homogeneous solution, the property of absorbing a halogen acid formed in the solution and the property of causing solubility of an acidimetric dye and of providing an operational environment therefor, whereby acidic materials are evolved in said solution, adding an acidimetric dye to said solution, and determining the amount of said evolved acidic material by titration with alcoholic base solution.

13. In a method of measuring X ray and gamma radiation quantities, the steps comprising exposing a homogeneous fluid solution containing halogenated aliphatic hydrocarbon as a solute and aqueous alcoholic solvent to said radiation, thereby causing the production and absorption of proportionate amounts of acidic halogen materials therein, adding an acidimetric dye to the solution, and titrating such solution with an alcoholic base solution to determine the quantity of the acidic halogen materials, whereby the quantity of such radiation may be determined.

14. An X ray and gamma radiation sensitive composition in which a color change indicates exposure to about 125 r. of such radiation comprising a solution mixture of the following components and proportions; (1) 10 parts by volume of a 50:50 mixture of carbon tetrachloride and 95% ethyl alcohol; (2) 0.2 parts by volume of a solution containing 0.1 gm. of Bromcresol Green indicator in 100 ml. of 10% ethyl alcohol solution adjusted to a pH of about 4.6; and (3) 2 parts by volume of $10^{-3}$ N 95% alcoholic potassium hydroxide solution.

15. An X ray and gamma radiation sensitive composition in which a color change indicates exposure to about 325 r. of such radiation comprising a solution mixture of the following components and proportions; (1) 10 parts by volume of a 50:50 mixture of carbon tetrachloride and 95% ethyl alcohol; (2) 0.2 parts by volume of a solution containing 0.1 gm. of Bromcresol Green indicator in 100 ml. of 10% ethyl alcohol solution adjusted to a pH of about 4.6; and (3) 4 parts by volume of $10^{-3}$ N 95% alcoholic potassium hydroxide solution.

16. An X ray and gamma radiation sensitive composition in which a color change indicates exposure to about 500 r. of such radiation comprising a solution mixture of the following components and proportions; (1) 10 parts by volume of a 50:50 mixture of carbon tetrachloride and 95% ethyl alcohol; (2) 0.2 parts by volume of a solution containing 0.1 gm. of Bromcresol Green indicator in 100 ml. of 10% ethyl alcohol solution adjusted to a pH of about 4.6; and (3) 8 parts by volume of $10^{-3}$ N 95% alcoholic potassium hydroxide solution.

(References on following page)

References Cited in the file of this patent

UNITED STATES PATENTS

| | | |
|---|---|---|
| 1,446,748 | Johnsen et al. | Feb. 27, 1923 |
| 2,168,464 | Yeda | Aug. 8, 1939 |
| 2,195,395 | Chapman | Apr. 29, 1940 |
| 2,616,051 | Daniels | Oct. 28, 1952 |

OTHER REFERENCES

"Radiochemistry—A Review of Recent Progress," Allsopp, Transaction of the Faraday Society—February 1944, pp. 79–86.

"Handbook of Chemistry and Physics," publ. by Chemical Rubber Publ. Co., Cleveland, Ohio, 1942, page 1324.

Gunther et al.—Article abstracted in Chemical Abstracts—vol. 23—page 1572 (1929), original article in Z. Elektrochem. 34 616–24 (1928).

Jacobs—"The Analytical Chemistry of Industrial Poisons, Hazards and Solvents," Interscience Pub. Inc., N. Y. (1949), pages 566, 591, and 592.

Effect of Radiations on Chloroform, Bishop, Journal Proc. of Sydney Technological College Chemical Soc. #5, pp. 66–69, 1933 (Chem. Abstracts 2272—vol. 28).